United States Patent [19]

Sampedro

[11] Patent Number: 5,149,115
[45] Date of Patent: Sep. 22, 1992

[54] COMPACT STORAGE STROLLER

[76] Inventor: Tony Sampedro, P.O. Box 247, Damascus, Ohio 44619

[21] Appl. No.: 783,251

[22] Filed: Oct. 28, 1991

[51] Int. Cl.$^5$ ............................................... B62B 7/00
[52] U.S. Cl. ........................... 280/33.998; 280/47.38; 297/239
[58] Field of Search ............. 280/33.998, 33.996, 280/33.991, 33.993, 47.38, 62, 47.4; 297/239, 244

[56] References Cited

U.S. PATENT DOCUMENTS

| | | | |
|---|---|---|---|
| 2,572,780 | 10/1951 | Tackenberg | 280/33.998 |
| 2,815,220 | 12/1957 | Schaeffer et al. | 280/47.3 |
| 3,112,121 | 11/1963 | Hummer | 280/33.994 |
| 3,217,839 | 11/1965 | Watkins et al. | 188/4 |
| 3,497,234 | 2/1970 | Schray | 280/33.993 |
| 3,519,286 | 7/1970 | Andersen | 280/33.991 |
| 3,524,655 | 8/1970 | Ballenger | 280/47.38 |
| 3,734,526 | 5/1973 | Propst et al. | 280/33.998 |
| 4,662,678 | 5/1987 | Halpert | 297/239 |

*Primary Examiner*—David M. Mitchell
*Attorney, Agent, or Firm*—Fleit, Jacobson, Cohn, Price, Holman & Stern

[57] ABSTRACT

A cart in the form of a stroller is provided including a forwardly tapering and height diminishing forward portion defining a rearwardly opening cavity and the width and height of the cavity increases rearwardly whereby the forward end portion of a second rear cart may be nested into the rearwardly opening cavity of the forward cart. In addition, the cart is constructed with upstanding opposite side portions between which an occupant's seat is defined and also an upwardly and rearwardly projecting rear wall terminating upwardly in a rearwardly directed horizontal handle, a lower portion of the rear wall defining a front-to-rear extending opening therethrough. The upper opposite side portions of the rear wall define projections which are receivable within upwardly opening recesses formed in the upstanding opposite side portions in a manner such that a third cart may be inverted and supported from the second rear cart with the handle of the third inverted cart projecting forwardly through the opening of the forward cart and the rearwardly projecting of the forward cart extending rearwardly through the opening in the rear wall of the inverted third cart, thereby enabling the number of carts to be stored in ganged relation for a given floor area to be doubled.

9 Claims, 2 Drawing Sheets 5,149,115

COMPACT STORAGE STROLLER

BACKGROUND OF THE INVENTION

1. Field of the Invention

This invention relates to a cart in the form of a stroller constructed in a manner to be ganged, in front-to-rear relatively displaced, tandem relation, for storage and transport and with the carts further constructed in a manner such that a third cart may be stored and transported in inverted ganged relation with tandem gang carts, with the inverted normally upstanding back of the third cart disposed between the upstanding backs of the tandem ganged carts.

2. Description of Related Art

Various different forms of carts heretofore have been provided including some of the general structural and operational features of the instant invention and some carts which are designed for tandem ganged compact storage and transport. Examples of the previously known forms of carts are disclosed in U.S. Pat. Nos. 2,572,780, 2,815,220, 3,112,121, 3,217,839, 3,524,655 and 3,734,526. However, these previously known forms of carts do not include carts which also may be arranged ganged tandem relation with alternate carts inverted relative to each other.

SUMMARY OF THE INVENTION

The cart of the instant invention comprises a stroller type of cart primarily designed to assist adult customers of shopping malls, zoos, amusement parks and hospitals in moving about with small children.

Persons who take small children with them whey they shop or visit various locations on the one hand must have a proper child's seat in the automobile or other transport vehicles and, if the child is not be carried while shopping or moving about other locations, a stroller also must be transported to the store or other locations. However, in some instances the required stroller may be in an absent automobile or other vehicle or in use by another adult with a second child. Further, many adults find collapsing, transporting, unfolding, using, collapsing, transporting and then unfolding their personal strollers after arrival back at home inconvenient and would like to have strollers available for children in stores and in other visited locations.

Accordingly, an important object of this invention is to provide a stroller to be marketed to stores and other locations for use by customers and visitors for the purpose of supporting and transporting small children.

Another object of this invention is to provide a stroller whose construction is such to enable ready cleaning thereof in order that customers will not object to using a stroller has transported other children.

Another object of this invention is to provide a stroller which may be ganged in front-to-rear nested relation for transport and compact storage.

The prime object of this invention, additionally, is to provide a stroller constructed in a manner such that it may be transported and stored in ganged relation more compactly than other previously known types of strollers or similar carts.

An important object of this invention is to provide a stroller constructed in a manner such that two upright front-to-rear ganged strollers may support therebetween an inverted third stroller, thereby enabling a given plurality of strollers to be stored in an area one-half the size of the area which would be occupied by the same number of normally front-to-rear ganged carts of the same type.

A final object of this invention to be specifically enumerated herein is to provide a stroller in accordance with the preceding objects and which will conform to conventional forms of manufacture, be of simple construction and easy to use so as to provide a device that will be economically feasible, long-lasting and relatively trouble free in operation.

Figure 1:
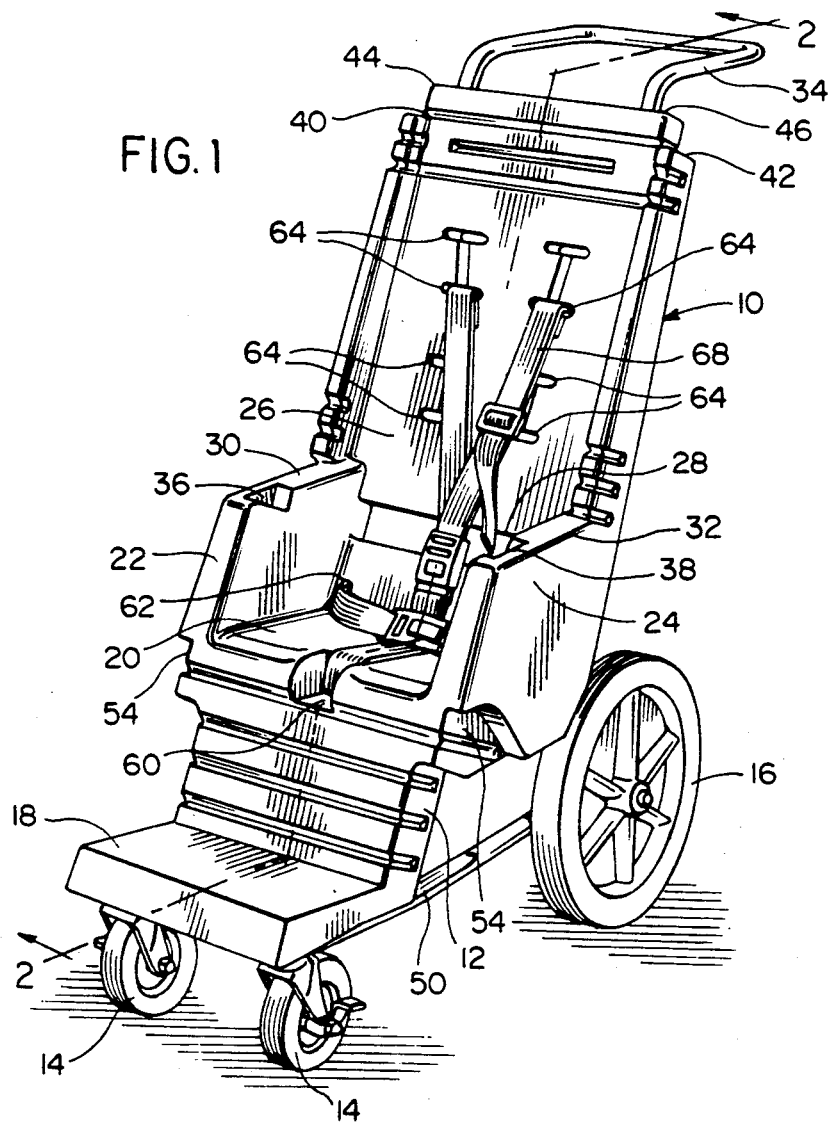
FIG. 1 is a front left perspective view of a stroller constructed in accordance with the present invention.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Referring now more specifically to the drawings the numeral 10 generally designates a cart in the form of a child stroller. The cart 10 includes a wheeled base 12 incorporating a pair of forward brake equipped dirigible wheels 14 and a pair of larger diameter opposite side rear wheels 16. The front dirigible wheels 14 are supported from the underside of a foot shelf 18 projecting forwardly from the forward lower portion of the base 12 and the upper portion of the base 12 defines a horizontal seat 20 embraced between upstanding opposite side portions 22 and 24 of the base 12. The side portions 22 and 24 project upwardly from opposite sides of the seat 20 and the rear marginal portions of the side portions 22 are interconnected by the lower end of an upstanding back or rear wall 26 projecting upwardly from the rear marginal edge of the seat 20.

The upstanding rear wall 26 defines a front-to-rear extending opening 28 extending therethrough at an elevation spaced below the upper portions 30 and 32 of the side portions 22 and 24 and the upper end of the rear wall 26 includes a horizontally rearwardly directed handle 34.

The upper portions 30 and 32 include upwardly opening recesses 36 and 38 formed there in and the upper end of the rear wall 26 includes opposite side upper corner notches 40 and 42 formed there in which define projection corners 44 and 46 at the upper opposite side corners of the rear wall 28 spaced above the lower extremities of the notches 40 and 42.

Figure 4:
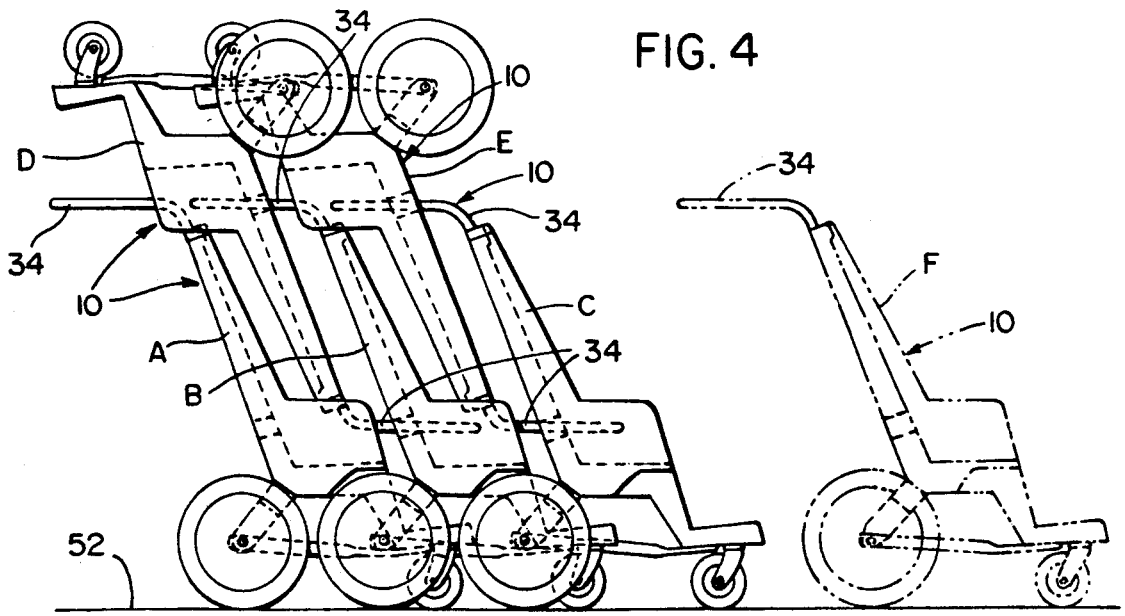
FIG. 4 is a side elevational view of three upright tandem ganged strollers of the instant invention and two inverted strollers with each inverted stroller interposed between and supported from a pair of inverted upright strollers, a sixth stroller being illustrated in phantom lines forward of the ganged strollers.
Figure 2:
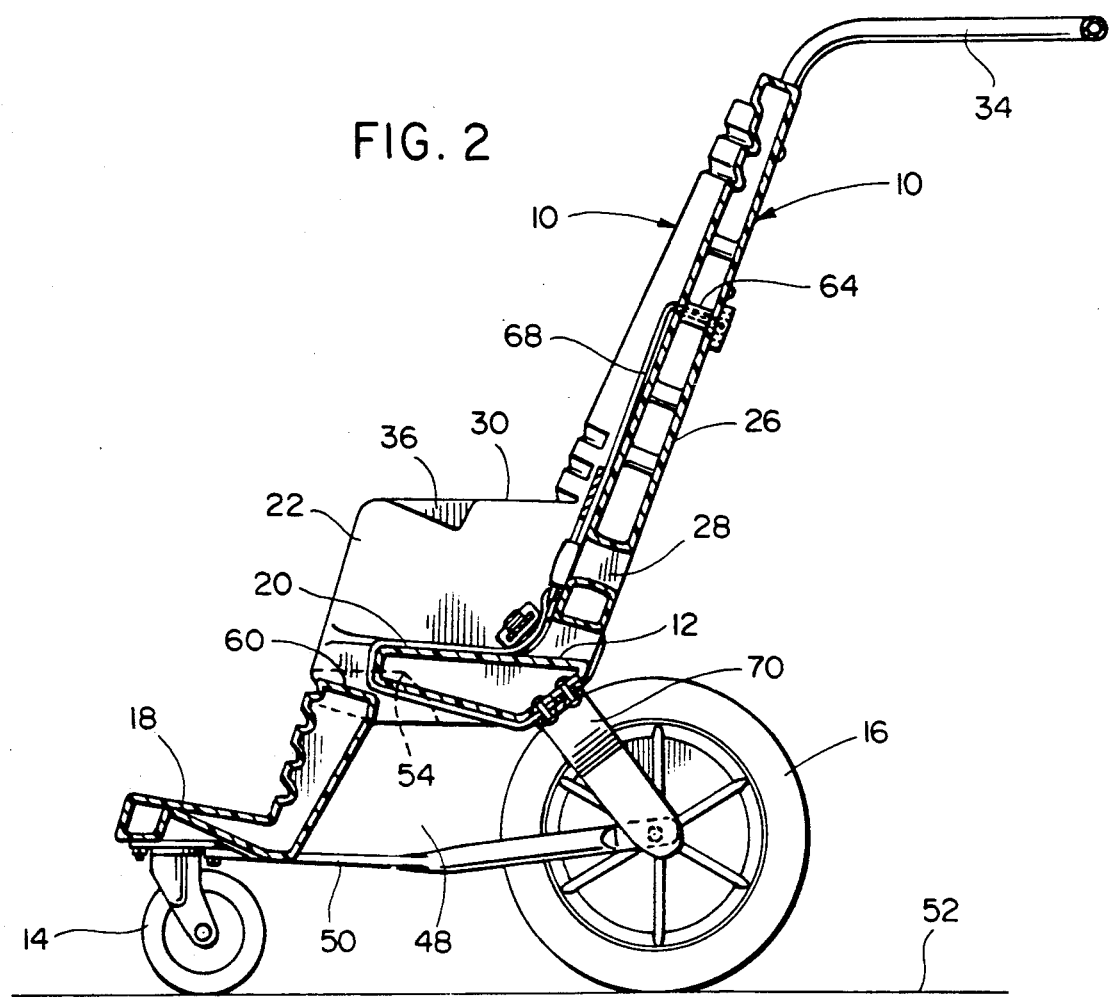
FIG. 2 is a longitudinal vertical sectional view of the stroller taken substantially upon the plane indicated by the section line 2—2 of FIG. 1.

From FIGS. 2 and 4 of the drawings it may be seen that the cart 10 defines a rearwardly opening cavity 48 between the rear wheels 16 and that the cavity diminishes forwardly in height. Further, the cavity 48 also tapers forwardly between the forwardly convergent opposite side horizontal braces 50 extending between the dirigible wheels 14 and the rear wheels 16. When two carts having their wheels 14 and 16 disposed on a horizontal surface are disposed one behind the other, the shelf 18 of the rear cart 10 is received within the cavity 48 of the front cart. Further, opposite side portions of the base 12 include forwardly and downwardly opening recesses 54 in which the rear wheels of a cart 16 are received when multiple carts such as carts "A", "B" and "C" illustrated in FIG. 4 are ganged together in tandem relation. In this manner, a plurality of carts may be transported and/or stored on the horizontal surface 52 in a compact manner, similar to the manner in which conventional shopping carts may be ganged together.

However, inasmuch as the front-to-rear extent of the base 12 in the seat area thereof is considerably greater than the front-to-rear extent of the rear wall 26, when the strollers "A", "B" and "C" are ganged together as illustrated in FIG. 4, considerable spacing exists between adjacent rear walls 26. In order to utilize this spacing and to further store additional carts 10 in the same floor area, a further cart 10 may be inverted between each pair of adjacent upright tandem ganged carts 10. Accordingly, FIG. 4 illustrates inverted carts "D" and "E" supported from and spaced between carts "A" and "B" and carts "B" and "C". The projection corners 44 and 46 of the inverted carts "D" and "E" are received in the recesses 36 and 38 of the carts "A" and "B", the handle 34 of cart "D" is received forwardly through the opening 28 of the cart "B", the rearwardly projecting handle 34 of cart "B" is received rearwardly through the opening 28 of inverted cart "D" and the handle 34 of inverted cart "E" is received forwardly through the opening 28 of cart "C" while the rearwardly projecting handle 34 of cart "C" projects rearwardly through the opening 28 of inverted cart "E".

In view of the above it may be seen that in the same floor space occupied by a given number of upright ganged carts, the same number of inverted carts also may be stored, thereby enabling a given storage space to store double the number of carts.

The seat 20 is provided with a forward central opening 60, the opposite sides of the lower end of the rear wall 26 are provided with opposite openings 62 and the upper portion of the rear wall 26 is provided with opposite side row of vertically spaced openings 64 with each row of openings 64 being communicated through the utilization of narrow slots 66.

A combined shoulder and seat harness assembly 68 is anchored relative to the seat 20 and the rear wall 26 through the utilization of the openings 60, 62 and 64 and may be adjusted to the size of a child disposed in the stroller 10 upon the seat 20.

Figure 3:
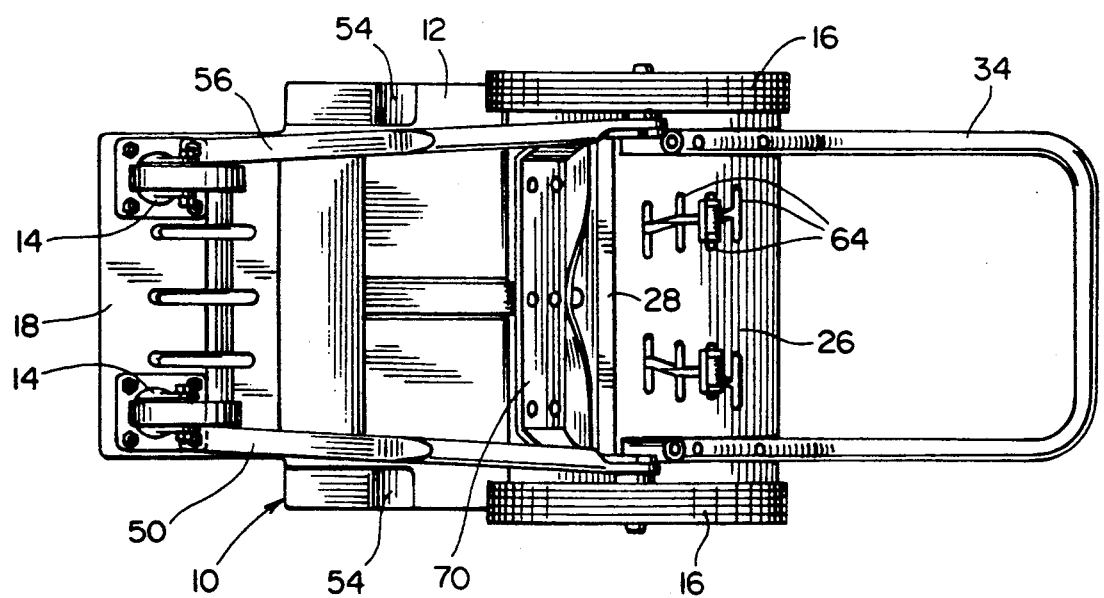
FIG. 3 is a bottom plan view of the stroller.

The base 12, shelf 18, seat 20, side portions 24 and rear wall 26 all may be constructed suitable plastic such as high density polyethylene with U.V. stabilizer to protect against fading. The braces 50 as well as the U-shaped brace 70, see FIGS. 2 and 3 may be constructed of corrosion resisted material as may the wheels 14 and 16. Further, it is proposed that the handle 34 will be constructed of stainless steel or similar material. In this manner, the cart or stroller 10 readily may be cleaned with high-pressure water jet or steamed cleaned. Further, the exterior of the plastic body is smooth and the harness assembly 68 incorporates adjustable shoulder straps, an adjustable lap strap and a crotch strap.

It is also pointed out that the cart "F" illustrated in FIG. 4 may be inverted and supported from the cart "C". Therefore, the floor area occupied by a given number of upright carts 10 also will contain an equal number of inverted carts 10. It is further pointed out that while the projection corners 44 and 46 of an inverted cart 10 are downwardly received in the upwardly opening recesses 36 and 38 of the cart 10 disposed therebeneath, the projection corners 44 and 46 of an upright cart are received in the downwardly opening recesses 36 and 38 of the cart 10 inverted thereover.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A cart for transporting objects, said cart including a wheeled base having front and rear end portions and defining a rearwardly opening cavity whose width and height increases rearwardly, said front end portion tapering forwardly in width and diminishing forwardly in height for reception within said cavity defined by another of said carts, whereby said carts may be ganged transported and stored in front-to-rear relatively displaced positions, said first mentioned cart including upstanding opposite side portions centrally intermediate said front and rear end portions and an upstanding rear wall including an upper end rearwardly directed handle and defining a front-to-rear extending opening through said rear wall, opposite side upper portions of said rear wall and said upper portions of said opposite side portions defining coacting projection and recess means for mating with each other to support yet another of said carts in inverted position relative to and from the first mentioned cart with the handle of the rear wall of said yet another cart extending forwardly through said front-to-rear extending opening of said another of said carts and the rearwardly projecting handle of said another of said carts projecting rearwardly through said opening of said yet another of said carts.

2. The cart of claim 1 wherein said wheeled base includes a pair of opposite side rear wheels and at least one front wheel.

3. The cart of claim 2 wherein said wheeled base includes a pair of opposite side dirigible front wheels.

4. The cart of claim 1 wherein said coacting projection and recess means includes a pair of projections defined by said opposite side upper portions of said rear wall and a pair of upwardly opening recesses defined by said upper portions of said opposite side portions.

5. The cart of claim 1 wherein said base, rear wall and upstanding opposite side portions define a child's seat between said upstanding opposite side portions and forward of said rear wall, said seat and rear wall include an occupant harness assembly supported therefrom including a waist strap, shoulder straps and a crotch strap.

6. The cart of claim 1 wherein said base, upstanding opposite side portions and upstanding rear wall are integrally constructed of plastic.

7. The cart of claim 1 wherein said coacting projection and recess means includes a pair of projections defined by said opposite side upper portions of said rear wall and a pair of upwardly opening recesses defined by said upper portions of said opposite side portions, said projections being defined by upwardly and outwardly opening notches formed in the opposite side portions of the upper extremity of said rear wall.

8. The cart of claim 7 wherein said base, upstanding opposite side portions and upstanding rear wall are integrally constructed of plastic.

9. The cart of claim 8 wherein said base, rear wall and upstanding opposite side portions define a child's seat between said upstanding opposite side portions and forward of said rear wall, said seat and rear wall include an occupant harness assembly supported therefrom including a waist strap, shoulder straps and a crotch strap.

* * * * *